United States Patent
De Nadai et al.

(10) Patent No.: US 12,370,730 B2
(45) Date of Patent: Jul. 29, 2025

(54) SYSTEM FOR OPERATING A FLUID ACTUATOR

(71) Applicant: INGLASS S.P.A., San Polo di Piave (IT)

(72) Inventors: Massimo De Nadai, San Polo di Piave (IT); Massimo Bisetto, San Polo di Piave (IT); Massimo Rossi, San Polo di Piave (IT)

(73) Assignee: INGLASS S.P.A, San Polo di Piave (IT)

( * ) Notice: Subject to any disclaimer, the term of this patent is extended or adjusted under 35 U.S.C. 154(b) by 143 days.

(21) Appl. No.: 18/019,842

(22) PCT Filed: Aug. 1, 2021

(86) PCT No.: PCT/IB2021/057024
§ 371 (c)(1),
(2) Date: Feb. 6, 2023

(87) PCT Pub. No.: WO2022/029589
PCT Pub. Date: Feb. 10, 2022

(65) Prior Publication Data
US 2023/0294344 A1  Sep. 21, 2023

(30) Foreign Application Priority Data
Aug. 7, 2020 (IT) .......................... 102020000019627

(51) Int. Cl.
*B29C 45/28* (2006.01)
*B29C 45/23* (2006.01)
*B29C 45/82* (2006.01)
*B29C 45/84* (2006.01)

(52) U.S. Cl.
CPC .......... *B29C 45/281* (2013.01); *B29C 45/231* (2013.01); *B29C 45/82* (2013.01); *B29C 45/84* (2013.01); *B29C 2945/76521* (2013.01); *B29C 2945/76688* (2013.01)

(58) Field of Classification Search
CPC ..... B29C 45/281; B29C 45/231; B29C 45/82; B29C 45/84; B29C 45/23; B29C 45/7613; B29C 2045/237; B29C 2945/76521; B29C 2945/76688
See application file for complete search history.

(56) References Cited

U.S. PATENT DOCUMENTS

2020/0114560 A1 *  4/2020  Chang ................. B29C 49/4289

FOREIGN PATENT DOCUMENTS

EP    2556941 A1 *  2/2013  ........... B29C 45/281

* cited by examiner

Primary Examiner — Galen H Hauth
Assistant Examiner — Baileigh Kate Darnell
(74) Attorney, Agent, or Firm — Rivka Friedman

(57) ABSTRACT

A system is described comprising an actuator with a piston linearly movable and a needle shutter connected to the piston for regulating the injection flow of molten material from a nozzle into a mold. By a supply circuit pressurized fluid is brought to the piston to move it back and forth. A solenoid valve is connected to the supply circuit and configured so that in resting condition it leaves open a fluid drainage path for bringing the shutter to a closing position.

8 Claims, 2 Drawing Sheets

SYSTEM FOR OPERATING A FLUID ACTUATOR

BACKGROUND

The invention relates to a system for operating a fluid actuator, in particular a system for adjusting/varying the stroke of a piston comprised in the fluid actuator.

In injection molding machines, taken here as an example, molten material is injected into a mold through one or more injection nozzles whose opening and closing is regulated by one or more stems controlled by an actuator. For complex or large parts, produced by multi-injection and/or sequential injection methods, the positional control of the shutter, which opens and closes the nozzle, is essential to obtain a high quality of finish, in particular to control the flow of molten material together with the injection pressure in the mold cavity. Currently, for the molding of valuable products, shutters are controlled by electric actuators (because they allow a wide range of adjustments and controls), which however require complex and expensive control devices (an electronic control unit+related software+sensors+complex wiring+specialized operators). The use of fluid actuators is therefore more convenient and more familiar to users for certain applications, see e.g. the system in FIG. 2 in EP3490777 which—commonly—uses a three-way solenoid valve 20 to control an actuator 1 via a fluid circuit.

A problem is that in case of sudden power voltage failure or in case of emergency, the solenoid valve 20 moves to the central rest position (position determined/set by the action of springs 220 and 230), locking the shutter in the current position and leaving the injection channel open. Clearly, this creates a potentially dangerous situation as well as considerable damage to the injection system.

SUMMARY

The main object of the invention is to improve this state of the art.

Another object is to improve systems such as the one in EP3490777 by making them safer, in particular by allowing the shutter to be repositioned in the closed position in the event of an electrical power failure.

An aspect of the invention relates to a system comprising:
  an actuator that is provided with a piston movably mounted to be moved linearly by the thrust of a fluid within two chambers separated by the piston,
  a needle shutter connected to the piston to regulate the injection flow of molten material from one or more nozzles into a mold,
    so that the shutter can move from a closing position, wherein there is no passage of molten material through the nozzle, to an opening position, wherein there is passage of molten material through the nozzle,
  a supply circuit for bringing pressurized fluid from a reservoir to the chambers with a flow direction and an opposite direction, the two fluid flow directions corresponding to a forward and a backward movement of the piston, respectively, and
  a solenoid valve, connected to the supply circuit and configured so that in rest condition it leaves open a fluid drainage path that connects the chambers and the reservoir to allow a flow of fluid, between the chambers and the reservoir, which causes a movement of the piston aimed at bringing the shutter towards a, or the, closing position.

A plurality of needle shutters may be connected to the piston, to be moved by the piston in synchronism.

In a variant the system comprises
  a main circuit constituting the power supply circuit, and
  fluid by-pass ducts, arranged to by-pass the main circuit, constituting the drainage path,
  the solenoid valve being inserted into the path of the bypass ducts, preferably comprising an excitation position wherein it closes the fluid drainage path.

Preferably, the path of the by-pass ducts comprises one or more one-way valves to assure in the by-pass ducts a flow direction of the fluid.

Preferably, the system comprises a second solenoid valve that is connected to the supply circuit and comprises
  two excitation positions:
    a first position wherein it allows fluid communication between the chambers and the reservoir by imposing a flow direction for the fluid in the supply circuit, and
    a second position wherein it allows fluid communication between the chambers and the reservoir by imposing in the supply circuit a flow direction for the fluid which is opposite to that obtainable in the first position, and
  a resting position, wherein it inhibits fluid communication between the chambers and the reservoir.

The second solenoid valve may also comprise only one of the two excitation positions. To have two fluid flow directions, two such solenoid valves may be placed in parallel.

In a different variant, the solenoid valve is inserted directly into the path of the supply circuit.

In particular, the solenoid valve comprises two excitation positions:
  a position wherein it allows fluid communication between the chambers and the reservoir by imposing in the supply circuit a flow direction for the fluid opposite to that obtainable in the rest position, and
  a position wherein it inhibits fluid communication between the chambers and the reservoir.

Or two solenoid valves may be inserted directly into the supply circuit path, each with an excitation position wherein they allow fluid communication between the chambers and the reservoir by imposing in the supply circuit a flow direction for the fluid opposite to that obtainable from the other solenoid valve.

The fluid may be a liquid, such as oil, or compressed air.

BRIEF DESCRIPTION OF THE DRAWINGS

The advantages of the invention will be even clearer from the following description of a preferred system, in which reference is made to the accompanying drawing in which.

DETAILED DESCRIPTION

In the figures equal elements are indicated by equal numbers.

Figure 1:
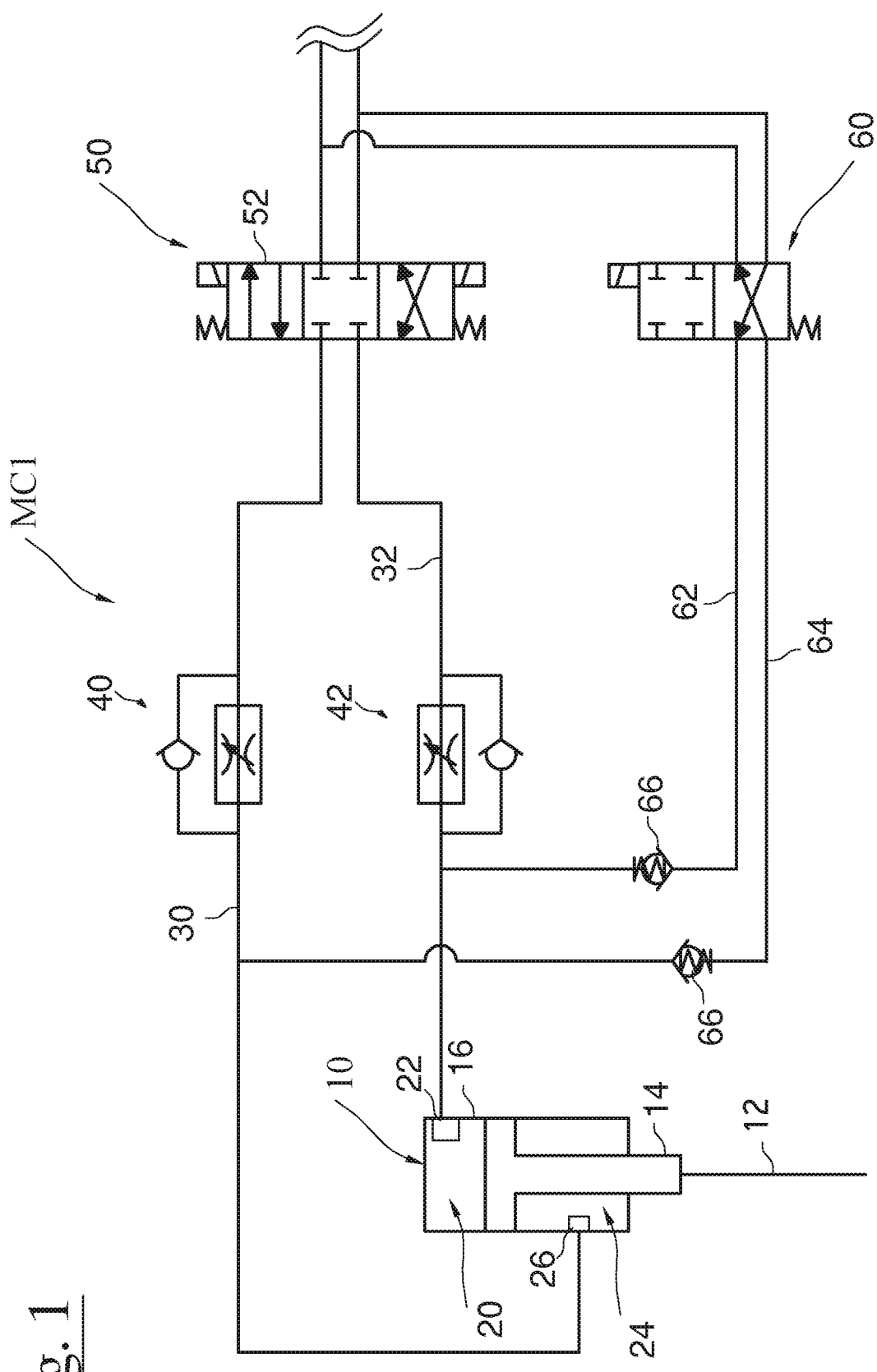
FIG. 1 shows a scheme of the system.

The system MC1 of FIG. 1 is used to drive an actuator 10. The actuator 10 is attached to a support, such as a hot runner (manifold) or a plate or mold, and is used to move (directly or indirectly, through interposed motion transformation mechanisms—not shown) at least one needle shutter 12 for an injection nozzle (not shown) by means of a piston 14. The piston 14 is linearly movable within a cavity defined by a housing 16. The cavity is divided by the piston 14 into a first chamber 20, communicating with a port 22, and a second chamber 24, communicating with a port 26. The chamber 20 is typically isolated from the chamber 24; however, situations may arise in which it is necessary to provide means for connecting the two chambers.

Through the fluid ports or inlets 22, 26, fluid, e.g. oil or compressed air, can be injected or extracted into/from the chamber 20 or 24 on opposite sides of the piston 14, respectively, so as to be able to move the latter linearly in opposite directions moving the shutter 12 accordingly. The movement of the shutter 12 determines the opening or closing of the nozzle with consequent passage or obstruction of the molten material.

The opening and closing of the nozzle, and therefore the movement of the shutter (pin), can take place according to a single movement in both directions (trend with a single opening ramp and a single closing ramp) or can comprise multiple and different intermediate stops (pauses of movement, according to pre-established parameters, after which the movement resumes according to the previous parameters (speed, pressure, flow rate, etc. . . . ) or according to modified parameters). It is possible to achieve infinite pauses of movement according to infinite positions, during the opening or closing movement.

A fluid circuit allows fluid to be transferred to and from the chambers 20, 24 by pumping it from an external reservoir (not shown, e.g. a tank). The circuit comprises a first line 30 and a second line 32. Optional flow regulators 40, 42 are also comprised in the lines 30, 32, which allow, in addition to a homogeneous movement, the setting of different movement speeds of the piston 14 along its stroke.

The flow regulators 40, 42 may be manually or automatically activated. In the latter case, they may be adjusted according to predetermined positions or on the basis of positional feedback given by appropriate position sensors (not shown) for the shutter or the piston.

A solenoid valve 50, having a displaceable drawer 52, is used to reverse, at each complete cycle, the direction of fluid flow in the lines 30, 32. The flow direction determines the movement direction of the piston 14, and thus of the shutter 12, during the opening or closing.

For this purpose, the solenoid valve 50 is electrically switchable to two different excitation positions in which it allows fluid to flow from the reservoir to the actuator 10:
in one position, some fluid can travel along line 32 toward chamber 20 and some fluid can exit chamber 24 toward line 30 (shutter 12 moving toward the closing position), and
in the other position, some fluid can travel along line 30 to chamber 24 and fluid can flow out of chamber 20 to line 32 (shutter 12 moving toward the opening position).

At rest the solenoid valve 50 remains in a position wherein it blocks fluid transit on lines 30, 32, so the piston 14 remains stationary.

The solenoid valve 50 is, for example, a commercial type with excitation coils and return springs.

In the event of an accidental power voltage failure and/or emergency conditions, the solenoid valve 50 will switch into the center position, thereby blocking the fluid flow and creating a critical safety condition in the system as described in the introduction, due to the immediate stop of the valve shutter 12 (in whatever position it is in).

To facilitate the closing of the shutter 12 under all circumstances and eliminate the inconvenience, the system MC1 comprises fluid by-pass ducts 62, 64 that by-pass lines 30, 32 towards the fluid reservoir. The ducts 62, 64 end on a solenoid valve 60 with a drawer that is electrically switchable between two different positions:
in a rest position, the solenoid valve 60 allows the transit of fluid in the lines 30, 32 from and to the reservoir, and
in the other position, with the solenoid valve 60 energized, the fluid flow is blocked.

One-way valves 66 are inserted into the ducts 62, 64.

Preferably, the system MC1 comprises an electronic control unit (not shown) to control at least the solenoid valves 50, 60 and a pump for moving the fluid. It is also possible to implement automatic control of the flow regulators 40, 42 as well.

During normal operation of the system MC1, in the presence of electrical voltage, the electronic control unit energizes the solenoid valves 50, 60. Then the solenoid valve 50 is controlled to regulate the fluid flow in the lines 30, 32 and its flow direction (to move the piston 14) while the solenoid valve 60 blocks the flow on the lines 62, 64.

In the event of an anomaly, or in the absence of voltage, the electronic control unit de-energizes the solenoid valves 50, 60. Then the solenoid valve 50 blocks the flow in the lines 30, 32 but the solenoid valve 60 allows a fluid flow in the lines 62, 64 that comprises
a flow of fluid exiting the chamber 24 and passing through the line 64, and
a flow of fluid entering the chamber 20 and passing through the line 62.

Such a flow of fluid allows the shutter 12 to be brought towards the closed position, thereby providing a safe position for the shutter 12.

Figure 2:
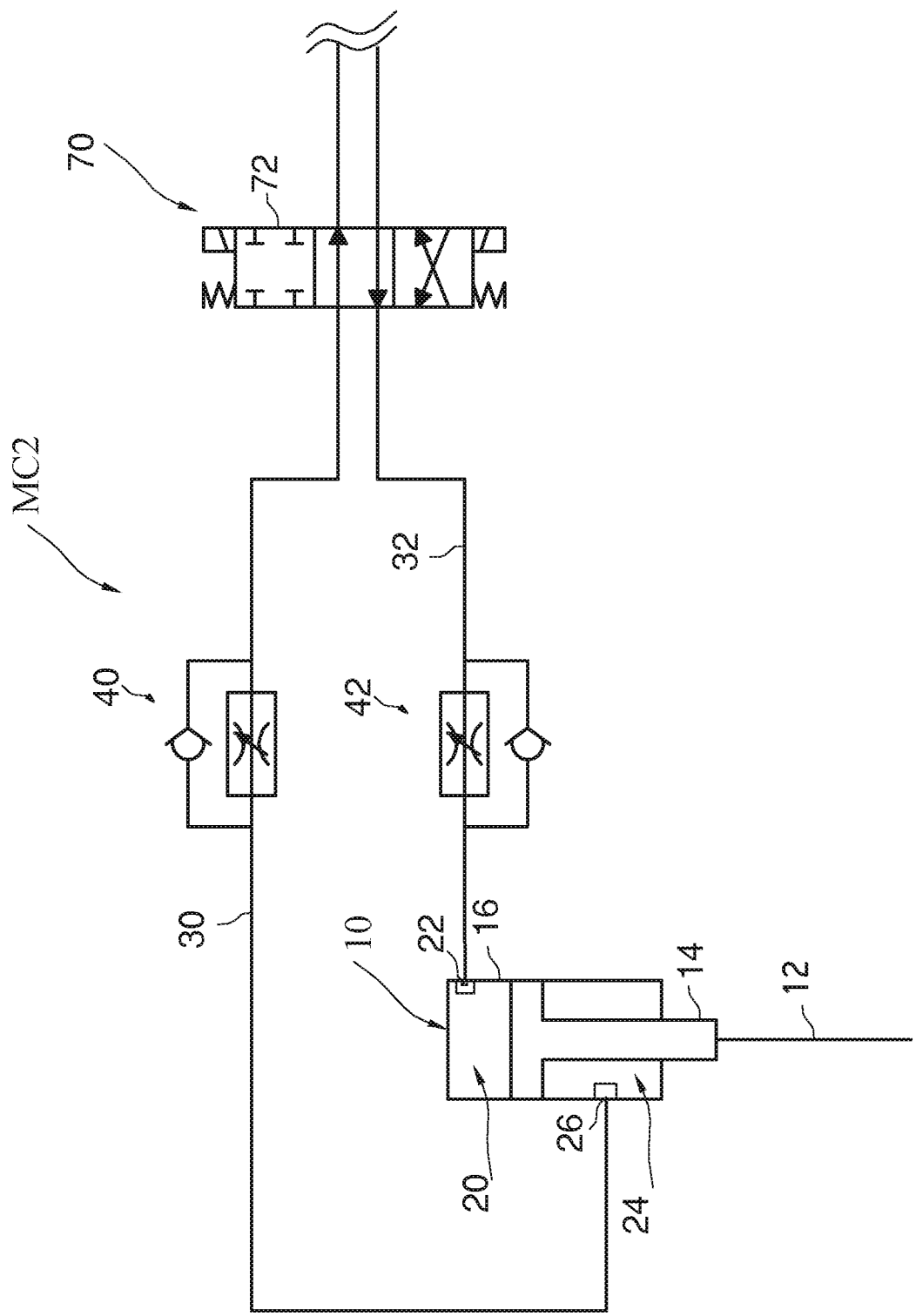
FIG. 2 shows a variant of scheme for the system.

A more compact and simple variant of the system MC1 is the system MC2 in FIG. 2.

The solenoid valve 50 and associated ducts 62, 64 were removed, and the solenoid valve 50 was replaced by a different solenoid valve 70, which has a drawer 72 that is electrically switchable between two excitation positions:
in a first position, some fluid can travel along the line 30 toward the chamber 24 and some fluid can travel along the line 32 exiting the chamber 20, and
in a second position the fluid flow is inhibited.

At rest, the solenoid valve 70 remains in a position wherein it allows fluid to flow through the line 32 to the chamber 20 and out of the chamber 24 to the reservoir via line 30.

It is understood that the system MC2 is inherently safe thanks to the solenoid valve 70, which in the event of an anomaly, or in the absence of voltage, automatically configures (or trips) so that a flow of fluid is possible in the lines 30, 32 to bring the shutter 12 to the closing position.

Note that in order to obtain the same dynamic profile for the shutter 12, the sequence of commands sent to solenoid valves 50 or 70 is different. In particular, in FIG. 2:
to raise the shutter 12 and open the channel for the molten material, the solenoid valve 70 is energized to bring it in the first position;
to lower the shutter 12 and close the channel, the solenoid valve 70 is de-energized;
to hold the shutter 12 in intermediate position, the solenoid valve 70 is energized to move the latter in the second position.

In general, the solenoid valve 70 is energized for holding the shutter 12 in the intermediate position, and moving the shutter 12 only in one direction.

In FIGS. 1 and 2, the solenoid valves 50 or 70 may be replaced by a pair of two-way solenoid valves that have a same resting configuration.

In both cases, by an appropriate management of the opening or closing positions of the piston's supply circuits, thus the different positions of the solenoid valves together with possibly the adjustment of the flow regulators, the invention as described allows making/implementing one or more of the opening and/or closing profiles described and shown in the following documents:
PCT/IB2019/053936, IT102017000037002, IT102016000080198, IT102016000055364, IT102015000008368, ITT02014A001030, ITT02014A001021, ITT02014A000701, WO2012/074879A1, WO2012/087491 A1 and WO2018/020177A1.

The invention claimed is:

1. System comprising:
    an actuator that is provided with a piston movably mounted to be moved linearly by thrust of a fluid within two chambers separated by the piston,
    a needle shutter connected to the piston for regulating an injection flow of molten material from a nozzle into a mold,
        so that the shutter can move from a closing position, wherein there is no passage of molten material through the nozzle, to an opening position, wherein there is passage of molten material through the nozzle, and vice versa;
    a supply circuit with a path for bringing pressurized fluid from a reservoir to the chambers with a flow direction and an opposite flow direction, the two fluid flow directions corresponding to a forward and a backward movement of the piston, respectively; and
    a solenoid valve, connected to the supply circuit and configured so that in resting condition it leaves open a fluid drainage path that connects the chambers and the reservoir to allow a flow of fluid between the chambers and the reservoir determining a movement of the piston that brings the shutter to a closing position,
        wherein the solenoid valve is inserted directly into the path of the supply circuit and the solenoid valve comprises two excitation positions:
            a position wherein it allows fluid communication between the chambers and the reservoir by imposing in the supply circuit a fluid flow direction opposite to that obtainable in the rest position, and
            a position wherein it inhibits fluid communication between the chambers and the reservoir.

2. System according to claim 1, comprising,
    a main circuit constituting the supply circuit, and
    fluid by-pass ducts, arranged for by-passing the main circuit in a path and, constituting the fluid drainage path,
        the solenoid valve being inserted in the path of the by-pass ducts.

3. System according to claim 2, wherein the path of the by-pass ducts comprises one or more one-way valves.

4. System according to claim 3, comprising a second solenoid valve which is connected to the supply circuit and comprises
    two excitation positions:
        a first position wherein it allows fluid communication between the chambers and the reservoir by imposing a flow direction for the fluid in the supply circuit, and
        a second position wherein it allows fluid communication between the chambers and the reservoir by imposing a fluid flow direction in the supply circuit opposite to that obtainable in the first position, and
        a resting position, wherein it inhibits fluid communication between the chambers and the reservoir.

5. System according to claim 2, comprising a second solenoid valve which is connected to the supply circuit and comprises
    two excitation positions:
        a first position wherein it allows fluid communication between the chambers and the reservoir by imposing a flow direction for the fluid in the supply circuit, and
        a second position wherein it allows fluid communication between the chambers and the reservoir by imposing a fluid flow direction in the supply circuit opposite to that obtainable in the first position, and
    a resting position, wherein it inhibits fluid communication between the chambers and the reservoir.

6. System according to claim 1, wherein the fluid is a liquid.

7. System according to claim 6, wherein the fluid is oil.

8. Method for controlling a system according to claim 1, wherein: controlling the system of claim 1 to raise the shutter and open a channel for molten material, the solenoid valve is energized, to lower the shutter and close the channel for molten material, the solenoid valve is de-energized, and to hold the shutter in an intermediate position, the solenoid valve (60; 70) is energized.

* * * * *